United States Patent [19]

De Hoff

[11] Patent Number: 4,954,196

[45] Date of Patent: Sep. 4, 1990

[54] PROCESS FOR CURING EPOXY RESIN ANHYDRIDE BLENDS AT MODERATELY ELEVATED TEMPERATURES

[76] Inventor: Ronald L. De Hoff, 43 Dickman Dr., Lavallette, N.J. 08735

[21] Appl. No.: 400,433

[22] Filed: Aug. 30, 1989

[51] Int. Cl.$^5$ ............................................. C08G 59/42
[52] U.S. Cl. .................................... 156/169; 528/110; 528/297; 156/173
[58] Field of Search ................ 528/110, 297; 156/169, 156/173

[56] References Cited

U.S. PATENT DOCUMENTS

| 2,947,717 | 8/1960 | Belanger et al. | 528/110 X |
| 2,951,778 | 9/1960 | Maberlin | 528/110 X |
| 3,142,657 | 7/1964 | Fisch | 528/110 X |
| 4,497,945 | 2/1985 | Salloum et al. | 528/110 X |

Primary Examiner—Earl Nielsen
Attorney, Agent, or Firm—Meredith P. Sparks

[57] ABSTRACT

Liquid acid anhydrides are excellent curatives for epoxy resins but state of the art processing methods require cures at temperatures in excess of 100° C. to obtain well cured polymers. It has been found that a resinous liquid polyol prepared from a polyol and an epoxy resin in the presence of a quaternary ammonium compound acts as an excellent promoter for the epoxy resin anhydride reaction producing well cured polymers at temperatures of about 70° C. The use of a metallo-organic compound in addition to the resinous polyol provides for rapid gelation and development of cure at 70° C.

14 Claims, No Drawings

PROCESS FOR CURING EPOXY RESIN ANHYDRIDE BLENDS AT MODERATELY ELEVATED TEMPERATURES

BACKGROUND OF THE INVENTION

Most of the epoxy resin systems that can be cured at temperatures below 100° C. require the use of an aliphatic or alicyclic liquid polyamine or modified versions thereof. Compounds of this type are notable for their volatility and in the same cases require excessive care in handling due to skin irritation and/or other health hazards. In addition, the amines must be used in relatively low concentrations with liquid epoxy resins. Even with an intrinsically low viscosity such amines do little to reduce the viscosity of the highly viscous epoxy resin. Their usefulness is generally restricted to adhesives, and some surface coatings where solvents can be used to reduce viscosity.

Liquid anhydrides however, are low in viscosity having for example 50 to 100 cps. They are used in large concentrations such as 80 parts liquid anhydride per 100 parts of liquid epoxy resin, and when combined with epoxy resins yield systems of low viscosity which are ideally suited for filament winding and in the potting of electrical and electronic components. They require cure temperatures of over 100° C., usually up to 150° C., producing heat distortion temperatures of up to 130 C in the case of the most widely used anhydride, namely methyltetrahydrophthalic anhydride.

At the present time, in order to reduce cure time requirements, a temperature of 90° C. is used for gelation. A solid quaternary ammonium salt is used as the promoter when methyltetrahydrophthalic anhydride is used with epoxy resin. This promoter produces a large exotherm during the curing with temperatures approaching 150° C., at which temperature copious amounts of fumes are given off. Thus when filament wound parts are put into an oven to complete the cure, it is necessary to use sizeable exhaust ducts to get rid of these vapors. There is an incentive therefore to develop a system which can be cured under heat lamps at reduced temperatures to minimize this evolution of fumes.

In addition, when a liquid epoxy-anhydride system is gelled at elevated temperatures and assumes a solid form, it will undergo thermal shrinkage upon return to room temperature. Since the coefficient of thermal expansion is greater for epoxy resin than for glass or metals, when these materials are encapsulated in epoxy resin they will be subjected to a level of stress proportional to the gel temperature and the difference between that and ambient temperature. Hence the ability to cure at temperatures below 100° C. would produce less strains in the epoxy resin composite.

The reaction between liquid epoxy resins and liquid anhydrides such as methyltetrahydrophthalic anhydride using state of the art promoters such as AP-6g produces well cured polymers only after one half hour gelation at about 90° to 100° C., followed by a two hour post cure at 150° C. AP-6g is a 60% by weight solution of benzyltriethyl ammonium chloride in ethyleneglycol. The heat distortion temperature of this polymer is between 125° and 130° C. when the liquid epoxy resin is Epon 828 which is essentially the diglycidyl ether of Bisphenol A. The performance properties of this polymer in many cases will far surpass the requirements of the application in which it is used. In addition, most commercial users of this system are interested in faster cures at lower cure temperatures. For example, conduit for electrical application is currently made of polyvinyl chloride. When this is subjected to flame, highly toxic fumes are emitted and in confined areas such as subways or underground malls this constitutes an extremely hazardous environment. A filament wound epoxy fiberglass reinforced tube prepared from an epoxy-anhydride system would perform satisfactorily at the ambient surface temperatures with a neat resin system of relatively low heat distortion temperature such as 80° to 90° C., since polyester resins of this quality perform satisfactorily. However, styrene containing polyester resins present severe manufacturing problems with the new environmental restrictions concerning the presence of styrene monomer.

Resinous polyols, derived from the reaction of epoxides and polyols in the presence of benzyltriethyl ammonium chloride, are moderately viscous liquids that can be added to either portion of the two part epoxy-anhydride system. Since they contain a very reactive promoter for this reaction they are versatile additions to the list of promoters currently used for the epoxy anhydride reaction. Other liquid promoters available for this purpose include imidazole and imidazole adducts, benzyldimethylamine, and solutions of benzyltriethyl ammonium chloride referred to above as AP-6g. These must be added to the anhydride since they react with the liquid epoxy resin to form a homopolymer. Resinous polyols, derived from the reaction of a brominated epoxide resin with a polyol in the presence of benzyltriethyl ammonium chloride, may be used as additives for flame retardance. Resinous polyols derived from epoxy resins and long chain polyols such as LHT-240 in the presence of benzyltriethyl ammonium chloride may be used in a dual role to accelerate the reaction and to impart flexibility to the system. The polyether triol LHT-240 has a molecular weight of about 700. It is manufactured by Union Carbide at Danbury, CT.

SUMMARY OF THE INVENTION

This invention describes a method for curing an epoxy resin-acid anhydride blend at moderately elevated temperatures, by the use of a resinous polyol derived from the reaction of a polyol and an epoxy resin in the presence of a quaternary ammonium compound. This resinous polyol acts as a promoter, and is completely reactive with either the epoxy resin or the anhydride. Modifications include the use of a minor amount of a metallo-organic compound in a mixture with the resinous polyol to speed gelation and to effect thorough cure.

The process of this invention is especially suitable for the filament winding of pipe, conduit and other structures with an epoxy-anhydride system using fiberglass, carbon fiber or other fibrous materials for reinforcement.

The process is likewise important in other uses such as casting, molding, potting and the like.

DETAILED DESCRIPTION OF THE INVENTION

The reaction between an epoxide resin and a hydroxyl group is quite sluggish requiring both an elevated temperature and the presence of a catalyst to consummate. By using benzyltriethyl ammonium chloride as the catalyst only small amounts of epoxy resin are consumed in a homopolymerization reaction of the epoxy resin to a polyether polymer. Also to avoid this undesirable feature, the epoxy resin is slowly added to the solution of benzyltriethyl ammonium chloride in a polyol at a temperature that favors the epoxy-hydroxyl reaction.

The resinous polyol which is formed by this reaction is then used as a promoter for the epoxy-anhydride reaction and effectively reduces the cure temperature to about 65° to 70° C. from state of the art cure temperatures of 90° to 150° C.

Although cure proceeds rapidly at these lower temperatures, the use of a metallo-organic compound such a chromium octoate in admixture with the resinous polyol reduces the gel time from 30 minutes to about 5 minutes at these lower temperatures.

In preparing the resinous polyols as described above it is obvious that the proportions of polyol and epoxy resin may be varied to produce either a polyol terminated polymer or an epoxy terminated polymer or mixtures thereof. Each of these products appear to function in a satisfactory manner in speeding cure. Benzyltriethyl ammonium chloride on heating decomposes to form triethylamine and benzyl chloride. At 90° to 95° C. the rate of decomposition is sufficient to furnish enough of the tertiary amine to catalyze the reaction between the epoxy resin and the hydroxyl but not large enough to promote the homopolymerization of the epoxy resin, provided the rate of addition of the epoxy resin is quite low. Although benzyltriethyl ammonium chloride is the preferred catalyst, other quaternary ammonium salts such as benzyltrimethyl ammonium chloride or benzyltripropyl ammonium chloride can be used as can other halide salts of benzyl trialkyl ammonium compounds, or other quaternary ammonium salts containing other alkyl or aryl groups.

Epoxy resins that are capable of reaction with an hydroxyl group can be used to prepare the resinous polyol by this reaction. The diglycidyl ether of Bisphenol A (Epon 828) is the preferred resin but the diglycidyl ether of tetrabromo-Bisphenol A can also be used as can the polyglycidyl ethers of phenol formaldehyde resins, the polyglycidyl ethers of cresol formaldehyde resins, cycloaliphatic epoxy resins, and aliphatic diepoxides such as butanediol diepoxide, neopentyl glycol diepoxide and the like.

Polyols suitable for the preparation of resinous polyols by this reaction include propanediol, butanediol, pentanediol, and the like and polyethylene glycols, polypropylene glycols and the like.

Resinous polyols obtained by this reaction are clear light amber colored liquids ranging in viscosity from 500 to 5000 centipoise depending upon the proportions of the reactants used. Viscosities are higher when the epoxy resin is employed in higher proportion to the polyol. The resinous polyols for example, are soluble in both epoxy resin and anhydride. Solutions of minor amounts, for example 1 to 30 parts per 100 parts of anhydride by weight have a long shelf life as do mixtures of resinous polyols and epoxy resins at any level of resinous polyol.

Anhydrides are used to cure epoxy resins in many applications. The anhydrides used are generally liquids to which a promoter has been added. The epoxy resin, generally a liquid, is heated to about 5° C. to reduce its viscosity. The two parts of the system are then mixed and cure is obtained by gelling the system at 90° to 100° C. and then post curing the gelled resin by holding it at 150° C. for two to three hours. In our process resinous polyols are added to the anhydride at room temperature, together with a minor amount of a metallo-organic compound such as chromium octoate. The mixture is then added to the epoxy resin which has been heated to about 50° C. This system is then gelled and cured at 70° C. for about one hour to yield a hard cured polymer with a heat distortion temperature of about 100° C.

Anhydrides which can be combined with epoxy resins to form systems which can be cured by the process of this invention include methyltetrahydrophthalic anhydride, methylhexahydrophthalic anhydride, nadic methyl anhydride, dodecynlsuccinic anhydride, and combinations of these with solid anhydrides such as phthalic anhydride, hexahydrophthalic anhydride, trimellitic anhydride and polydride identified chemically as 4-4 (2-acetoxy 1,3 glyceryl)bis anhydro trimellitate. Solid dianhydrides such as pyromellitic dianhydride and benzophenone-tetracarboxylic dianhydride also may be incorporated.

Epoxy resins which can be cured by this process include the diglycidyl ether of Bisphenol A and others previously described for use in the preparation of the resinous polyol.

In order to produce a cured product from an epoxy resin-anhydride blend at temperatures as low as 70° C., it is necessary to use at least 1 part of benzyltriethyl ammonium chloride per 100 parts of liquid epoxy resin by weight when the liquid epoxy resin has a weight per epoxide of 185-190 grams, and 0.1 part of chromium octoate per 100 parts of liquid epoxy resin having the same epoxide content. At this same level of chromium octoate an upper limit for satisfactory results is 5 parts of benzyltriethyl ammonium chloride per 100 parts of liquid epoxy resin having the same epoxide content. When the epoxide content of the various epoxy resins increase, additional quantities of each promoter may be required.

Therefore, in using the resinous polyols, it is necessary to add the amount sufficient to attain these levels to obtain a satisfactory cure. Resinous polyols are also effective at higher cure temperatures in reducing the cure time for epoxy resin-anhydride blends with their level of use being dependant upon the size and shape of the resin mass. This is because of the need to avoid excess exotherm in thick masses and to induce more heating in thin sections. Exact levels need to be determined for each application. The same restrictions also apply to the level of the chromium octoate modifier. Experimental work along these lines include standardizing on a 10 gram mass in an aluminum weighing dish producing a 1/4 inch thick casting, 2 inches in diameter. All data reported in this application are based on this standard condition.

Modifications of this process include the following:

(a) a modification consisting of the addition of a metallo-organic compound to the acid anhydride and resinous polyol mixture before addition to the epoxy resin which has been heated to about 50° C. to reduce its viscosity;

(b) a modification consisting of the addition of a metallo-organic compound to the anhydride before the addition of the resinous polyol;

(c) a modification consisting of the addition of an amount from 0.1 to 1.0 parts of chromium octoate, added as a 40% by weight solution of chromium octoate in LHT-240, to 100 parts of the anhydride by weight, followed by the addition of from 1 to 30 parts of resinous polyol per 100 parts by weight of the anhydride.

Such mixtures have unlimited shelf lives and simplify the process by limiting the coreactants to 2 rather than 4 components;

(d) a modification in which the epoxy compound used to prepare the resinous polyol is a aliphatic diepoxide; and (e) a modification in which the polyol used to prepare the resinous poly is LHT-240.

EXAMPLE I

A series of resinous polyols were prepared using various proportions of epoxy resin, ethylene glycol, and benzyltriethyl ammonium chloride. The preparations were carried out as follows: A solution of benzyltriethyl ammonium chloride in ethylene glycol was heated to about 90° C. and liquid epoxy resin was added slowly while holding the temperature between 85° and 9° C. The time of addition was about one hour with vigorous agitation of the reaction mixture. After addition of the epoxy resin, the mixture was stirred for one more hour at 90° C. to complete the reaction. Proportions of ingredients were as follows:

TABLE I

|  | A | B | C |
|---|---|---|---|
| Ethylene glycol gms | 62 | 62 | 62 |
| Benzyltriethyl ammonium chloride gm | 145 | 145 | 145 |
| Liquid epoxy resin (WPE = 185–190) gms | 83 | 185 | 560 |
| % Benzyltriethyl ammonium chloride | 50 | 36.9 | 18.9 |
| Viscosity of polyol, cps | 500 | 4000 | 8000 |

EXAMPLE II

The polyols prepared in Example I were compared for their efficiency in promoting the cure of an epoxy resin-acid anhydride blend with a commonly used promoter AP-6g which is a 60% solution of benzyltriethyl ammonium chloride in ethylene glycol. Liquid epoxy resin (Epon 828) having a weight per epoxide of 185-190 and ECA-100 which is methyltetrahydrophthalic anhydride were mixed and to this blend were added the various resinous polyols and also AP-6g. To these mixtures were added small amounts of AP-10 which is a solution of chromium octoate in glycol with 40% by weight of chromium octoate. 10 gram samples of the various mixtures were then placed in aluminum weighing dishes under a heat lamp providing a surface temperature of 70° C. Results were as follows:

TABLE 2

|  | D | E | F | G |
|---|---|---|---|---|
| Liquid epoxy resin gms | 10 | 10 | 10 | 10 |
| Liquid anhydride (MTHPA)** gms | 8 | 8 | 8 | 8 |
| AP-10 gms | 0.1 | 0.1 | 0.1 | 0.1 |
| AP-6g gms | .6 | — | — | — |
| Example I-Polyol A gms | — | 0.7 | — | — |
| Example I-Polyol B gms | — | — | 1.0 | — |
| Example I-Polyol C gms | — | — | — | 2.0 |
| Phr* Benzyltriethyl ammonium chloride | 3.6 | 3.6 | 3.6 | 3.6 |
| Gel time at 70° C., 10 gms, minutes | 13 | 13 | 6 | 6 |

*Parts per 100 parts of epoxy resin by weight
**Methyltetrahydrophathalic anhydride A useful and convenient method of determining the degree of cure of a thermoset polymer involves the use of a Shore D Durometer. This instrument is manufactured by the Shore Instrument Company of Jamaica, N.Y. and is essentially a spring loaded needle which is pressed against the surface of a cast polymer to produce a dial reading of from 0 to 100 units. A close approximation of the heat distortion temperature of a polymer is "that temperature at which the Shore D reading is 70 to 80 units."

In this example, after gelation under the heat lamp at 70° C., and a total cure of 1 hour at this temperature, the heat lamp was moved closer to the cast specimens to produce a heat rise of about 10° C. per minute until the temperature reached 100° C. The Shore D hardness was measured every 10° C. as follows:

TABLE 3

| Temperature °C. | Hot Shore D Readings | | | |
|---|---|---|---|---|
|  | D | E | F | G |
| 70 | 80 | 80 | 80 | 80 |
| 80 | 80 | 80 | 80 | 80 |
| 90 | 60 | 80 | 80 | 80 |
| 100 | 30 | 30 | 75 | 30 |

These data indicate that sample F is most effective in producing a good cure at 70° C. with a heat distortion temperature of more than 100° C., while the others including the control produce polymers with heat distortion temperatures of less than 90° C. for the control, and between 90° and 100° C. for the others.

EXAMPLE III

A mixture of 30.6 grams of glycerin with 68.5 grams of benzyltriethyl ammonium chloride was heated and stirred to 75° C. When the solution became clear, 72.1 grams of Epon 828, the diglycidyl ether of Bisphenol A made by the Shell Chemical Company of Houston, Tex., was then added in about 45 minutes while holding the temperature at 75° to 85° C. The clear light amber liquid was then heated and stirred at 75° to 85° C. for an hour to complete the reaction.

EXAMPLE IV

A mixture of 70.6 grams of benzyltriethyl ammonium chloride and 30 grams of ethylene glycol was heated and stirred to 70° C. 67 grams of neopentyl glycol diepoxide, a product of Wilmington Chemical Company of Wilmington, Del., was then added over a 1 hour period while holding the temperature at 85° to 95° C. The clear low viscosity liquid was then heated and stirred at 85° to 95° C. for one hour.

EXAMPLE V

A mixture of 12.2 grams of benzyltriethyl ammonium chloride and 5.2 grams of ethylene glycol was heated and stirred to 80° to 90° C. 16.7 grams of DEN 438, a resin composed of the polyglycidyl ethers of a Novolac phenolic resin, made by Dow Chemical Company of Freeport, Tex., were then heated to 50° C. to reduce viscosity, and then added slowly over a one hour period, while stirring and holding the temperature at 80° to 90° C. At the end of the addition the clear viscous liquid was stirred for one hour at 80° to 90° C.

EXAMPLE VI

In addition to heat distortion temperature, the degree of cure of an epoxy-anhydride polymer can be determined by exposing cured castings to boiling water for extended periods of time. The predominantly ester linked polymers that result from the epoxy-anhydride reaction tend to undergo hydrolytic scission, particularly when free acid groups are left on the polymer chain. The break up of the polymer structure and resultant loss of cross linking is shown by a loss in heat distortion temperature, which can be determined by a measurement of Shore D hardness at elevated temperatures. To illustrate this effect a series of castings were prepared as previously described in aluminum weighing dishes and then placed in boiling water for 50 hours. At the end of this time the castings were placed under a heat lamp at 80° C. and Shore D hardness was measured. The formulations were as follows:

TABLE 4

|  | H | J | K |
| --- | --- | --- | --- |
| Liquid epoxy resin (Epon 828) | 10.0 | 10.0 | 10.0 |
| Liquid anhydride (MTHPA) | 8.0 | 8.0 | 8.0 |
| AP-10 | 0.1 | 0.1 | 0.1 |
| AP-6g | 0.6 | — | — |
| Example I - Polyol B | — | 1.0 | — |
| Example V - Polyol D | — | — | 0.9 |

These formulations were cured for 1 hour under a heat lamp which produced a surface temperature of 70° C.±5° C. All exhibited Shore D hardness of 80° at 70° C. after cure. The castings were then removed from the aluminum weighing dishes and placed in a hot water bath at 100° C. for 50 hours. They were then removed from the bath and placed under a heat lamp set to provide a surface temperature of 80° C. The results were as follows:

TABLE 5

|  | Hot Shore D Hardness (80° C.) | |
| --- | --- | --- |
|  | Initial Reading | After 50 hours in boiling water |
| Polymer H (control) | 80 | 30 |
| Polymer J | 80 | 80 |
| Polymer K | 80 | 80 |

These data show that the control, Polymer H which used as a promoter a 60% by weight solution of benzyltriethyl ammonium chloride in ethylene glycol, was 'depolymerized' by hydrolytic scission, whereas Polymers J and K using as promoters Polyol B and Polyol D respectively were not affected by boiling water.

I claim:

1. A process for curing an epoxy resin-acid anhydride blend at moderately elevated temperatures comprising the steps of:
    (a) reacting an epoxy compound and a polyol for about 1 to 4 hours at elevated temperatures to produce a resinous polyol;
    (b) mixing an acid anhydride with the resinous polyol from step (a);
    (c) adding the anhydride-resinous polyol mixture from step (b) to an epoxy resin which has been heated to about 50° C. to reduce its viscosity; and
    (d) heating the mixture from step (c) at from 60° C. to 90° C. for one hour to effect cure.

2. The process of claim 1 wherein a metallo-organic compound is added to the mixture from step (b) before addition to epoxy resin as described in step (c).

3. The process of claim 1 wherein said polyol is ethylene glycol.

4. The process of claim 1 wherein said epoxy compound is the diglycidyl ether of Bisphenol A.

5. The process of claim 1 wherein said a quaternary ammonium compound is present during the reaction of step (a).

6. The process of claim 1 wherein said anhydride is methyltetrahydrophthalic anhydride.

7. The process of claim 2 wherein said metallo-organic compound is a solution of chromium octoate in a resinous polyol having a molecular weight of about 700.

8. The process of claim 5 wherein the quaternary ammonium compound is benzyltriethyl ammonium chloride.

9. The process of claim 1 wherein a metalloorganic compound is added to the anhydride before the addition of the resinous polyol as described in step (b).

10. The process of claim 1 wherein an amount from 0.1 to 1.0 parts of chromium octoate is added as a 40% by weight solution of chromium octoate in a polyether triol having a molecular weight of about 700 is added to 100 parts of the anhydride by weight, followed by the addition of from 1 to 30 parts of resinous polyol per 100 parts by weight of the anhydride.

11. The process of claim 1 wherein the epoxy compound used to prepare the resinous polyol is a cycloaliphatic diepoxide.

12. The process of claim 1 wherein the polyol used to prepare the resinous polyol is a polyether triol having a molecular weight of about 700.

13. The process of claim 1 wherein said temperature is in the range of 65° to 70° C.

14. A process for the filament winding of pipe and conduit with an epoxy resin-acid anhydride system using fiberglass, carbon fiber and other fibrous materials for reinforcement wherein:
    (a) a resinous polyol is prepared from an epoxy compound and a polyol at elevated temperatures and then added to a liquid acid anhydride.
    (b) a metallo-organic compound is then added to the mixture from step (a).
    (c) an epoxy resin is mixed with the product from step (b) and the resulting blend is used as the adhesive in a filament winding process, and the resulting pipe or conduit is heated at 70° to 100° C. for about 1 hour to effect cure.

* * * * *

UNITED STATES PATENT AND TRADEMARK OFFICE
CERTIFICATE OF CORRECTION

PATENT NO. : 4,954,196
DATED : Sep.4, 1990
INVENTOR(S) : Ronald L. De Hoff

It is certified that error appears in the above—identified patent and that said Letters Patent is hereby corrected as shown below:

Column 3, line 64, change "5°C" to 50° C--;

Column 5, line 17, change "9°C" to --95°C--.

Signed and Sealed this

Eighth Day of September, 1992

Attest:

DOUGLAS B. COMER

Attesting Officer

Acting Commissioner of Patents and Trademarks